United States Patent Office 3,830,701
Patented Aug. 20, 1974

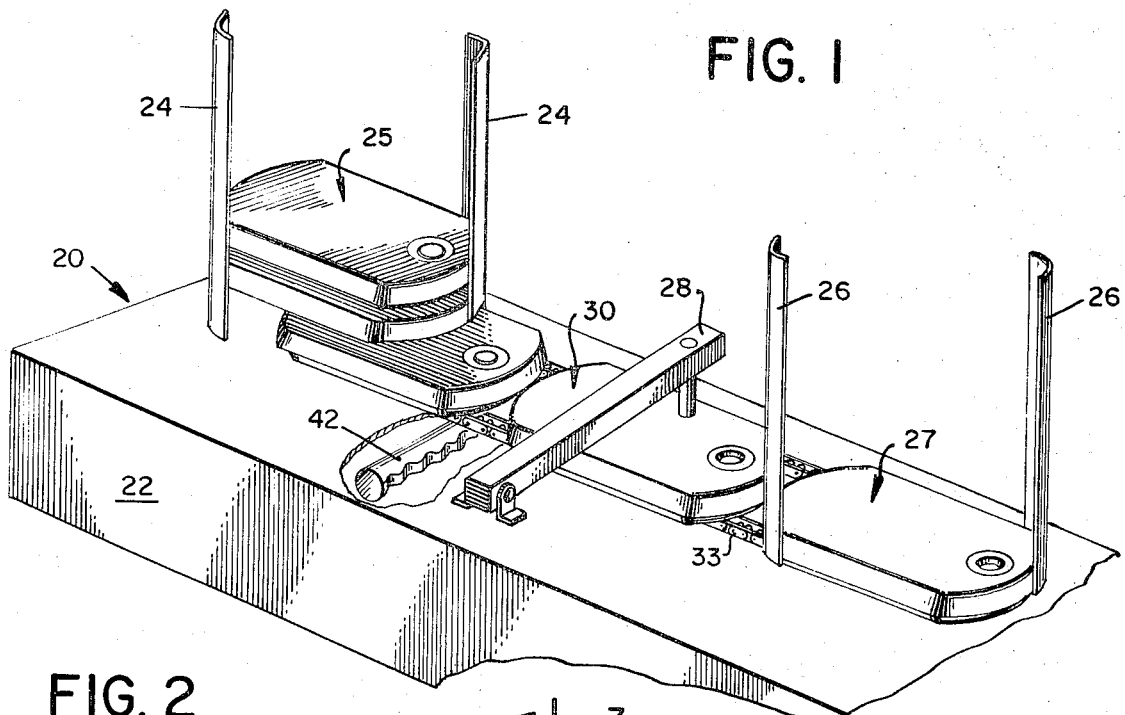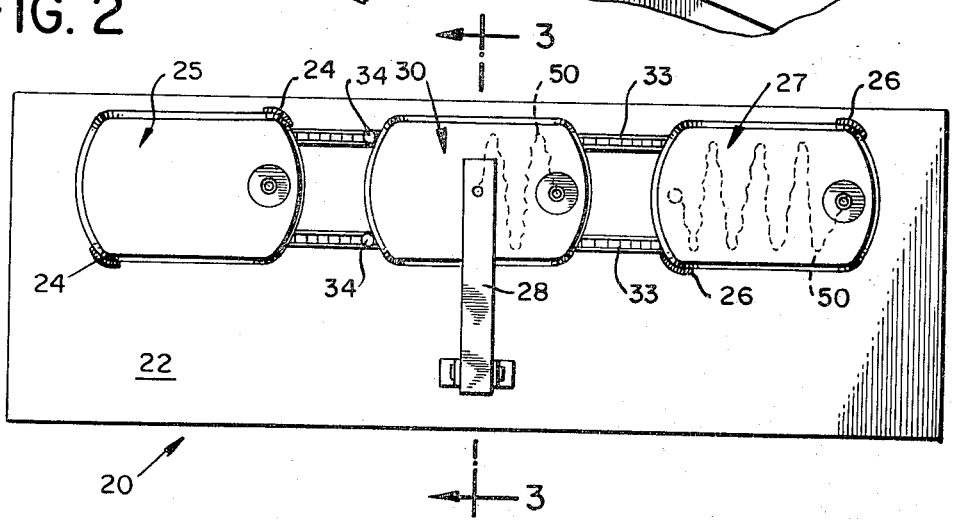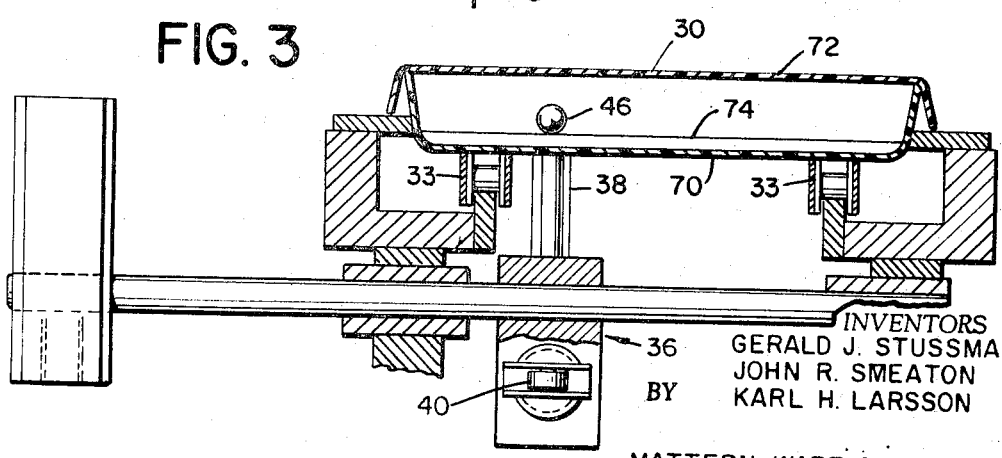

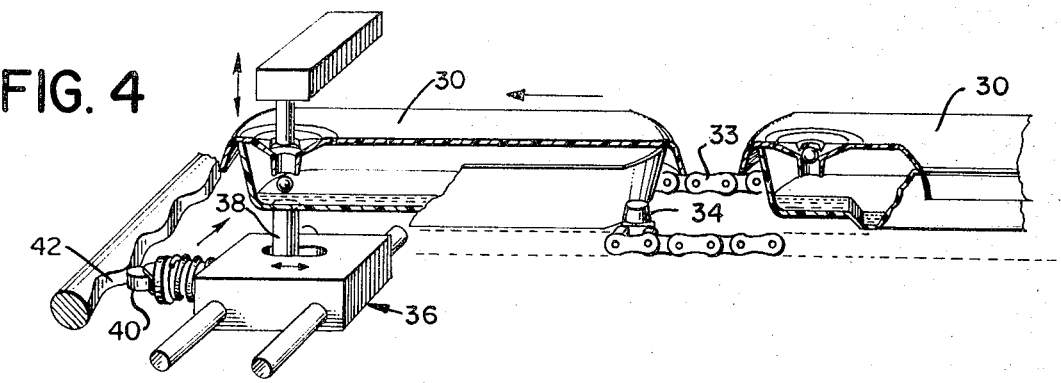
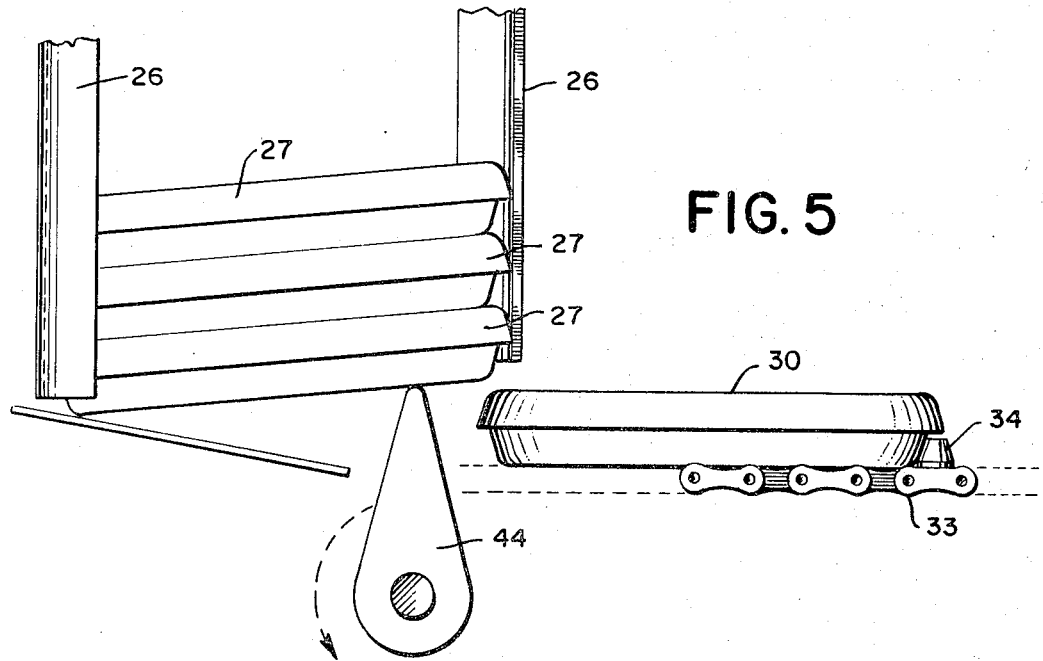

3,830,701
AUTOMATIC PETRI DISH STREAKING
METHODS AND APPARATUS
Gerald J. Stussman, Bethel, Conn., Karl H. Larsson, Monrovia, Calif. and John R. Smeaton, Ridgefield, Conn., assignors to Hycel, Inc., Houston, Tex.
Filed Sept. 8, 1970, Ser. No. 70,028
Int. Cl. C12b 1/02
U.S. Cl. 195—120
24 Claims

ABSTRACT OF THE DISCLOSURE

A captive spherical ball initially suspended in the cover of a petri dish serves as a spreader for streaking and isolating bacteria from a sample. After inoculum is placed on the agar culture medium at one point in the petri dish, the ball is released and dropped into the inoculum. As the dish advances across a streaking station, an underlying magnet reciprocates, rolling the ball through the inoculum and then along a predetermined zig-zag path across the agar in the moving petri dish, depositing microorganisms across the culture medium. This system quickly and automatically spreads or "streaks" the bacteria sample over the culture medium in the petri dish without requiring human exposure or contact with the bacteria sample. When streaking is completed, the ball is recaptured to avoid disturbing the streaked sample.

SUMMARY OF THE INVENTION

This invention relates to the "streaking" and isolation of bacteria samples in a petri dish, and more particularly to automatic streaking for micro-organism isolation and quantitation.

To determine the identity of the infectious microorganisms in a particular sample, conventional procedures employ a petri dish containing a culture medium which allows the particular organism to grow and multiply after streaking in isolated colonies. Cultured bacteria colonies are identified and counted on an average basis to estimate the number and type of bacteria present per unit of sample. Generally, this culturing process is accomplished by first uniformly spreading the inoculum sample throughout the petri dish.

Another bacteria culturing process consists of adding the bacteria-laden sample or "inoculum" to the culture medium at one point in the petri dish, and then spreading or "streaking" the bacteria-laden sample throughout the petri dish with a sterilized metal rod, wire loop or the like, using successive groups of short parallel streaking strokes. During this streaking process, care must be exercised to assure that each streaking sequence begins from the terminating point of the last streaking sequence. Consequently, only the first streaking sequence commences from the bacteria sample, and streak lines are produced which have continually decreasing bacteria content. The density of colonies that are cultured in the agar medium along the successive streaking lines therefore decreases, providing discrete colonies which allow identification of organisms present in the original sample.

These conventional, manual streaking procedures are employed in most medical laboratories, despite serious disadvantages. The major problem resulting from this technique is the constant health hazard to which the technician is exposed. The streaking method is accomplished in an open petri dish with the technician using a thin wire probe to streak the bacteria-laden sample. This forces the technician to be in continual close contact with many samples, some of which may be highly infectious. Also, since each sample must be individually streaked manually throughout the petri dish, this process is extremely laborious, time-consuming and expensive. Furthermore, the procedure is prone to error since after each streak line is made the technician must sterilize the thin wire probe. Failure to sterilize the probe, after making any of the streak sequence lines, significantly reduces the reliability of the results.

Accordingly, it is a principal object of this invention to provide reliable, fully-automatic petri dish streaking methods and apparatus.

Another object of this invention is to provide petri dish streaking apparatus capable of being streaked while sealed, thereby reducing human exposure to harm.

A further object of this invention is to provide a petri dish streaking apparatus that operates continuously and successively on a stored group of dishes without constant human attention.

Another object of this invention is to provide petri dish streaking apparatus which substantially reduces technician error, operating time, and health hazards.

A further object of this invention is to provide petri dish streaking apparatus capable of efficient and systematic distribution of the bacteria-laden sample throughout the culture medium of the petri dish without returning to the initial sample location.

Still another object of this invention is to provide streaking methods capable of reliably spreading a pre-determined volume of bacteria-laden sample along a predetermined path on a culture medium carried by a petri dish, an agar tape or other substrates into automatic controlled culture storage environments.

Other and more specific objects will be apparent from the features, elements, combinations and operating procedures disclosed in the following detailed description and shown in the drawings.

In this invention, the bacteria-laden inoculum sample is preferably placed on the culture medium at one end of an elongated petri dish, and then the petri dish is sealed. The technician does not come into close contact with the sample until the bacteria colonies have been cultured. A steel ball is initially captively suspended in the cover of the sealed petri dish, and during passage through an automatic streaking machine, the steel ball is released from its suspended position and dropped into the bacteria-laden inoculum sample on the culture medium. A magnet is positioned below the petri dish aligned with the position of the steel ball. The magnet reciprocates beneath the petri dish from one side to the other, and while the magnet moves from side to side, the petri dish is advanced continuously along a processing path by a slowly-moving drive belt.

The movement of the magnet causes the ball to follow its path since the ball is within the magnet's attractive field. The compounded movement of the magnet and the petri dish causes the attracted ball to roll through the culture medium along a sinuous path resembling a sine wave until it has travelled from one end of the petri dish to the other. A second magnet is located in the petri dish at the terminating point of the ball's path. The magnet captures and holds the steel ball securely in position as the dish moves beyond the driving magnet.

When the ball is first dropped into the bacteria-laden sample in the petri dish and moves through this sample, microorganisms coat the surface of the ball, and are deposited on the culture medium throughout the petri dish as the ball rolls along its sinuous path through the dish. As with the manual streaking process, more colonies will be found after incubation along the earlier portion of the path than will be found along the latter portion of the path. The amount of bacteria sample to be spread is controlled by the size of the ball used.

Once the petri dish has been inoculated with the bacteria-laden sample and sealed by its accompanying lid, the petri dishes are loaded in the automatic streaking machine. This machine automatically streaks the petri dish and also delivers the streaked dishes in a stack. The stack is then merely removed from the machine and placed in an appropriate incubator. This substantially reduces the human exposure to possibly harmful organisms, while reducing technician time involved and greatly improving reliability of the streaking procedure.

THE DRAWINGS

FIG. 1 is a perspective view of automatic streaking apparatus employed in one embodiment of this invention;

FIG. 2 is a top plan view of the automatic streaking apparatus of FIG. 1;

FIG. 3 is a cross-sectional view of the automatic streaking apparatus taken along line 3—3 of FIG. 2;

FIG. 4 is a fragmentary perspective view of the streaking station of the automatic streaking apparatus;

FIG. 5 is an enlarged side elevation view of a portion of the automatic streaking apparatus of FIG. 1;

DETAILED DESCRIPTION

Figure 6:
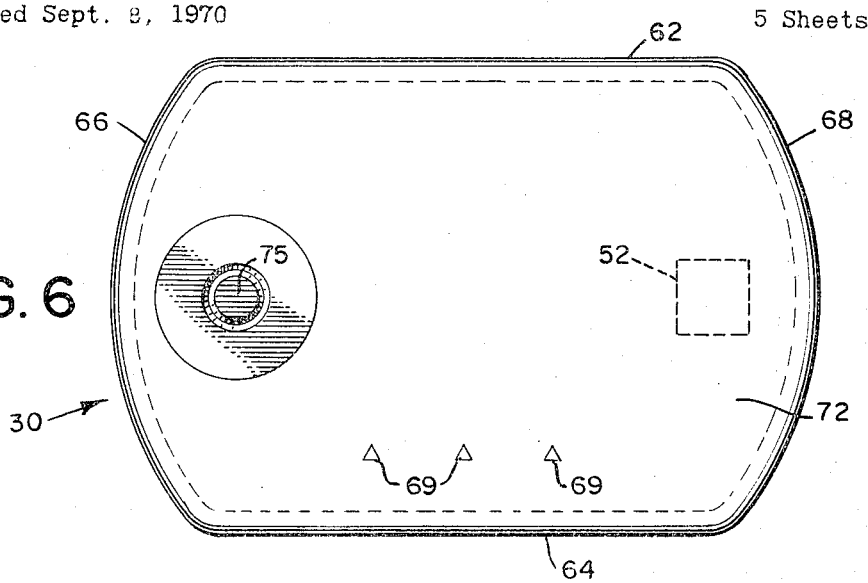
FIG. 6 is a top plan view of the preferred embodiment of the petri dish used in the automatic streaking apparatus of FIG. 1.
Figure 7:
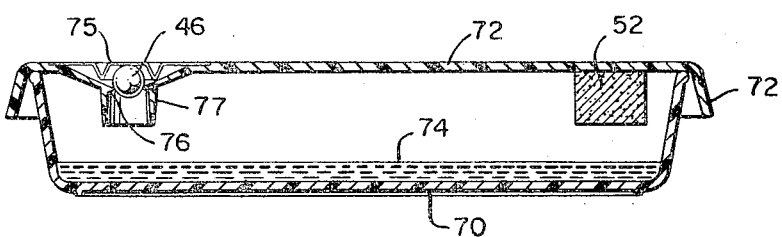
FIG. 7 is a cross-sectional side elevation view of the petri dish of FIG. 6, showing the ball in its initial captive suspended position before being dropped into the culture medium.
Figure 8:
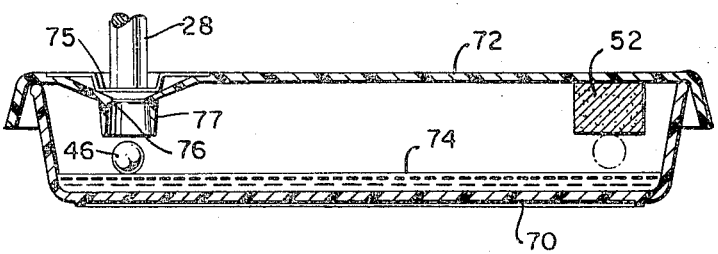
FIG. 8 is a side elevation view of the petri dish of FIG. 6 with the ball released into the culture medium, and showing also a ball in phantom in its captured position after travelling through the petri dish.

A preferred embodiment of the automatic streaking apparatus of the invention is shown in FIG. 1. Streaking apparatus 20 comprises a base 22, two upstanding stack holders 24 and 26, ball release arm 28, a stack of inoculated, unstreaked petri dishes 25, petri dishes 30 undergoing automatic streaking, and a stack of streaked petri dishes 27. As best seen in FIGS. 3 and 4, base 22 of automatic streaking apparatus 20 incorporates chain link drive belts 32 and 33 and dish pushing tabs 34.

Disposed at a streaking station below petri dishes 30 as shown in FIGS. 2, 3 and 4, is the ball driving assembly 36, which incorporates a reciprocating magnet 38, an oscillator cam follower 40, and an oscillator cam surface 42. In FIG. 5, a stacking cam 44 is shown raising the stack of streaked petri dishes 27, to allow the next petri dish to enter the lower end of the stack.

In operation, each elongated petri dish is individually inoculated at one end with the inoculum sample to be streaked, and then sealed with its cooperating cover. The sealed petri dishes are then loaded into unstreaked stack 25. From this loading point on, the entire streaking operation is completely automatic. Dish pushers 34 on drive belts 32 come into firm, driving contact with the rear end of the lowest petri dish in stack 25, causing it to be drawn out from under the loading stack.

When the leading edge of this petri dish 30 reaches ball release arm 28, arm 28 moves vertically downward releasing the trapped ball 46 from its secured position in the cover of petri dish 30. When ball 46 drops into the inoculated bacteria-laden sample on the culture medium, it is attracted and held in this position by reciprocating magnet 38 of ball driving assembly 36, best seen in FIG. 4.

Ball driving assembly 36 moves along wavy, undulated cam surface 42 continuously from drive belt 32 to drive belt 33 and back again. Ball 46 rollingly follows the movement of assembly 36 since it is held by the magnetic field of magnet 38. As assembly 36 moves from one side to the other, chain drive belts 32 and 33 and pusher tab 34 continuously advance petri dish 30. This compound motion causes ball 46 to roll back and forth across the agar medium in a zig-zag path. This preferred path of ball 46 through dish 30 is represented by line 50 in FIGS. 2 and 9.

Figure 9:
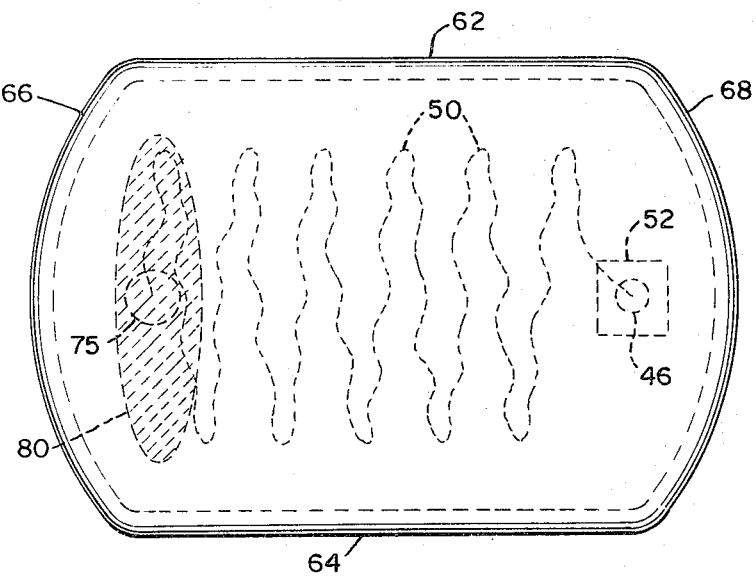
FIG. 9 is a top plan view of the petri dish of FIG. 8, showing the sinuous streaking path along which the ball travels.

Preferably, path 50 combines laterally reciprocating sinusoidal motion with longitudinal "jogging" oscillations of lesser amplitude, as shown in FIGS. 2 and 9.

This desired sinuous winding path can be achieved with several different drive arrangements. The camming surface 42 and follower arm 40 producing the lesser-amplitude longitudinal oscillations can be eliminated by employing two longitudinally adjacent magnets or one rocking U-shaped magnet. With this construction, the magnets or magnet poles can be alternately raised and lowered in angular oscillating fashion to cause the ball to roll alternately between one and the other, producing longitudinal rolling oscillations of the ball. As with the longitudinally oscillated magnet 38 described above, the side-to-side reciprocating movement of the magnet assembly is superimposed upon the forward progression of the petri dish to achieve the desired resultant sinuous path.

Another drive variation employs a motor or jogging drive mechanism slowly advancing dish 30 with longitudinally oscillating forward and backward steps, two steps forward for each step back. In combination with a single reciprocating magnet 38 that moves from side to side as the petri dish 30 joggingly advances, this produces the wavy, sinusoidal zig-zag path shown in FIGS. 2 and 9. The jogging motion of the petri dish 30 compounded with the reciprocating movement of the ball leading magnet causes the ball 46 to move through the culture medium in the desired path.

When ball 46 reaches the end of its winding path 50, the ball comes into the magnetic field of a capture magnet 52 anchored inside the lid of dish 30, and is trapped and held in this position as dish 30 moves beyond the field of reciprocating magnet 38. Simultaneously with the capture of ball 46 by magnet 52, stacking cam 44 raises the stack of streaked petri dishes 27 to allow the leading end of the most recently streaked petri dish to enter the bottom of the streaked stack 27 and then be pushed firmly into alignment with the bottom of stack 27 by dish pusher 34 on chain drive belt 32. The streaked petri dishes 27 may then be moved by the technician and placed in culture incubating storage, and close contact with the bacteria laden sample is eliminated.

A preferred embodiment of petri dish 30 is shown in FIGS. 6, 7, 8 and 9. The preferred sidewall shape of petri dish 30 comprises flat parallel or outwardly slanting sides 62 and 64, and outwardly curved ends 66 and 68. Petri dish 30 comprises base 70 and cover 72. The culture medium, preferably an agar solution, overlies the interior surface of the bottom of base 70, ready for use. Recessed in cover 72 is a concave ball-storage cavity having a ball release aperture defined by a resilient circular flange 76 which supportingly retains ball 46, being slightly smaller than the diameter of the ball. Overlying the stored ball is a flexible membrane shield 75 which covers and protects ball 46 against airborne contamination. Cover 72 also incorporates an optional tubular ball guide 77, and at its other end, ball capturing magnet 52 is cemented to the underside of cover 72.

When the ball releasing arm 28 (FIG. 1) moves vertically downward, shield 75 and ball 46 are depressed, thereby spreading and enlarging flange 76 to allow ball 46 to drop through tube 77 into the culture medium 74 in base 70 of petri dish 30.

After ball 46 has travelled through the path 50 shown in FIG. 9, ball 46 comes into the magnetic field of capturing magnet 52 and is captured by it. The capture and retention of ball 46 by magnet 52 assures that no further bacteria will be deposited or disturbed in the culture medium after the winding travel of ball 46 along its predetermined path 50 is completed.

The complex movement of ball 46 through culture medium 74 achieves several important objectives. Referring to FIG. 9, the cross-hatched zone surrounded by dotted line 80 represents the inoculated bacteria-laden sample or inoculum to be streaked. Ball 46 begins at this position 80 and then winds its way through culture medium 74. Path 50 is predetermined as described above to assure that ball 46 will have maximum exposure to inoculum 80 initially and then to culture medium 74 as it moves from one end of petri dish 30 to the other.

The sinusoidal-wavy sinuous path 50 between sides 62 and 64 assures that ball 46 will not merely rotate along its equator but instead will continuously roll from side to side through culture medium 74 exposing a maximum surface area of ball 46 to the sample and then to the culture medium. The longitudinal oscillations of magnet 38 thus cause "poleward" or "meridional" rolling motion of ball 46 superimposed upon the equatorial rolling motion caused by reciprocation of magnet 38.

In the existing streaking procedures performed manually, the technician does not return to the original bacteria-laden sample after the first streak is made, but instead continues to streak the petri dish from the last series of streaks. This provides an indication of the presence and severity of an infection by merely observing the density and type of successive bacteria cultures that are produced by the last series of streaks.

In the streaking methods of this invention, the wavy sinusoidal path 50 that ball 46 travels across agar medium 74 from end 66 to end 68 of dish 30 assures that ball 46 is exposed to the inoculated bacteria-laden sample 80 only during the initial stages of streaking, while the remainder of the ball's movement along path 50 is guided across culture medium 74, depositing the bacteria carried by ball 46. As with the prior art streaking procedure, an indication of the type and quantity of bacteria in the sample can be determined by observation of the colonies grown after incubation along the latter part of path 50. "Quantitation marks" 69 on transparent overlying cover 72 allow the operator to measure the number of organisms in the original sample as indicated by the dispersion of organisms along streaking path 50.

The shape of petri dish 30 leaves little room for operator error, since cover 72 can only be placed on base 70 in two ways. If by accident the technician were to place cover 72 improperly on base 70, with the ball storage cavity at the wrong end of dish 30, rather than at the leading end of the advancing dish, the dish and its accompanying sample would still be usable later, since the lowered ball release arm 28 simply would not release the non-aligned ball 46. As a result, upon realization of the error, the technician would merely remove cover 72, rotate it 190°, reseal petri dish 30 with its cover 72 now properly positioned, and replace the petri dish in loading stack 25 of automatic streaking apparatus 20.

Figure 10:
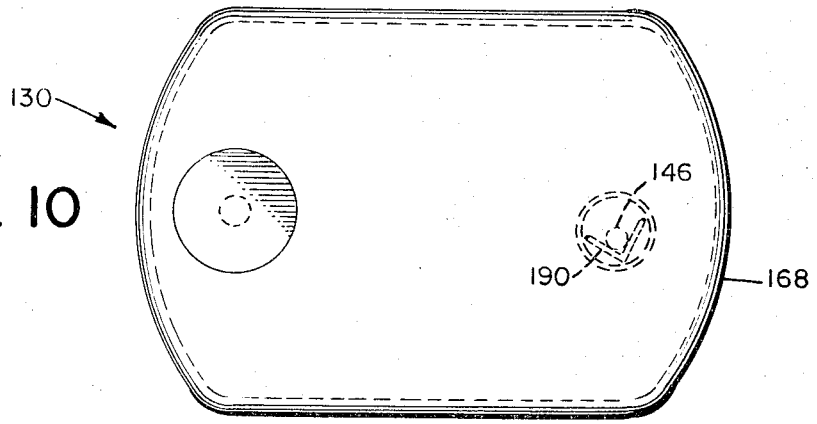
FIG. 10 is a top plan view of a petri dish similar to that of FIG. 6 incorporating a different ball capture structure.
Figure 11:
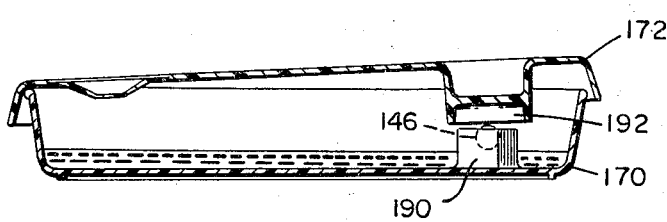
FIG. 11 is a cross-sectional side elevation view of the petri dish of FIG. 10.

In FIGS. 10 and 11, another embodiment is shown for capturing and securing a ball 146 after it has travelled through a modified petri dish 130. In this embodiment, base 170 of petri dish 130 incorporates a V-shaped upstanding boss 190 at arcuate end 168, concavely shaped to receive the ball 146 as it arrives at capture position in the manner an ice hockey puck is received in the hockey goal structure. Cover 172 of petri dish 130 incorporates a circular boss 192 which is aligned with and surrounds boss 190 of base 170.

As the underlying magnet 138 moves ball 146 through the latter stages of its winding path, cover 172 is slightly raised as ball 146 enters V-shaped boss 190 and is retained therein. The petri dish 130 leaves the magnet 38 while cover 172 is lowered and resealed. With cover 172 in place, ball 146 is enclosed within boss 192 and is not capable of rolling back into the culture medium since the surrounding boss 192 of cover 172 encircles and entraps ball 146.

Figure 12:
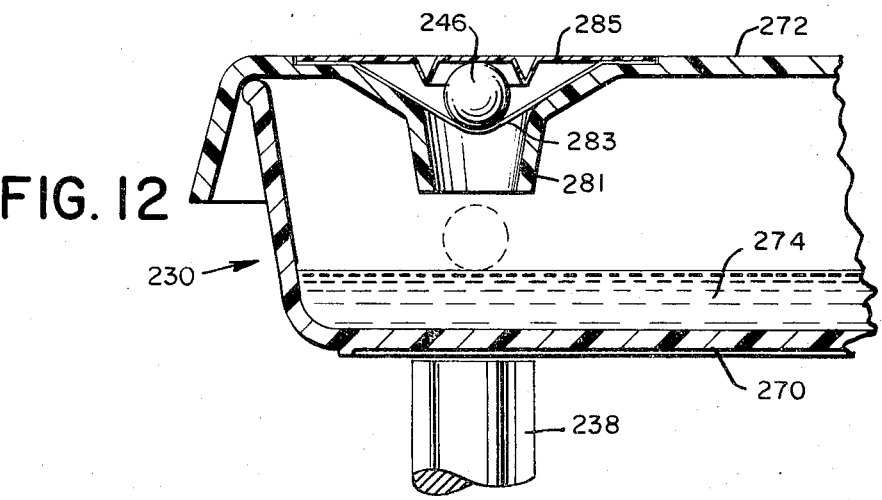
FIG. 12 is a fragmentary enlarged cross-sectional side elevation view of still another embodiment of a petri dish, showing the ball suspended.

Another embodiment for suspending ball 46 in the cover of the petri dish is shown in FIG. 12. In this embodiment petri dish 230 has a cover 272 which incorporates a funnel shaped cavity 281, a ball supporting membrane of brittle material 283, and a strong flexible external shield membrane 285. Brittle material 283 is secured to the large diameter end of funnel shaped boss 281 so that brittle material 283 will suspend ball 246 above a ball release opening in the cavity 281. The strong resilient membrane 285 surroundingly encloses ball 246 with the terminating rim of material 285 sealed to brittle material 283 and the large diameter end of funnel shaped cavity 281.

In operation, the ball release arm contacts resilient material 285, depressing material 285 aganist ball 246 and exerting pressure on brittle material 283. When sufficient pressure has been exerted on stressed brittle material 283, this material ruptures, thereby allowing ball 246 to drop through funnel shaped boss 281 into the culture medium 274 on base 270. In this position ball 246 is attracted to magnet 238 and rollingly drawn along path 50 through culture medium 274 by the relative movement of magnet 238 and dish 230, as described above.

Figure 13:
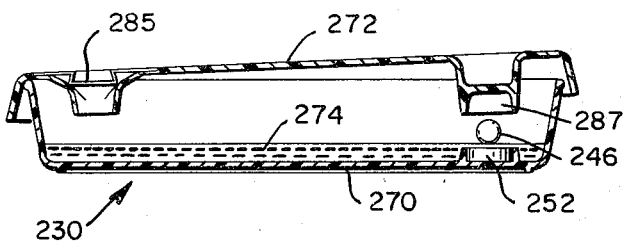
FIG. 13 is a cross-sectional side elevation view of the petri dish of FIG. 12 showing the ball being captured after completing its streaking movement.
Figure 14:
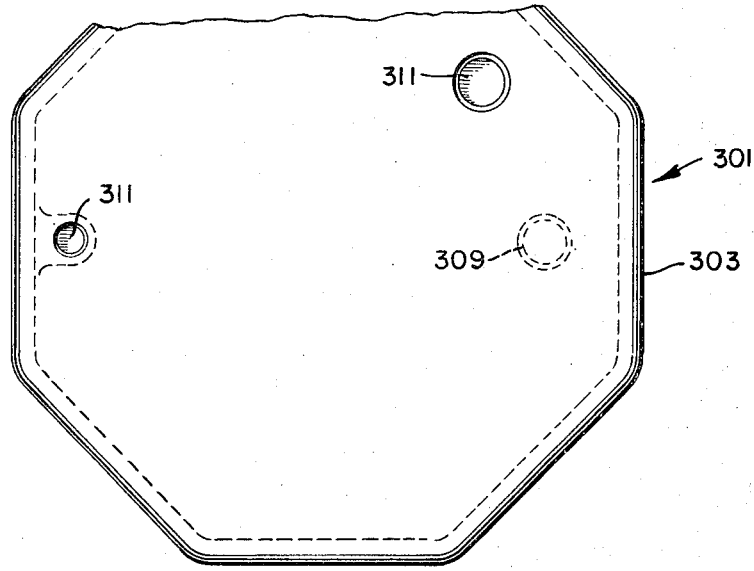
FIG. 14 is a top plan view of still another embodiment of a petri dish having a regular polygonal shape, showing the ball prior to being admitted to the solution.

In FIG. 13, another embodiment of a ball capture feature is shown. Base 270 incorporates a capture magnet 252 and cover 272 incorporates a cooperating boss 287. When magnet 238 is moving ball 246 through the latter stages of its winding path through petri dish 230, cover 272 is raised while ball 246 moves onto magnet 252. In this position ball 246 is attracted and held by the force of magnet 252 while the dish 230 leaves driving magnet 238. Cover 272 is then reclosed with boss 287 surroundingly enclosing ball 246 on magnet 252, thereby securely holding ball 246 in position with complete assurance that ball 246 will not drop back into culture medium 274. Boss 287 and boss 192 both incorporate depressed regions of the dish cover closely overlying the captured ball, to assure that jarring of the streaked dish will not release the ball from its captured terminal position.

Figure 15:
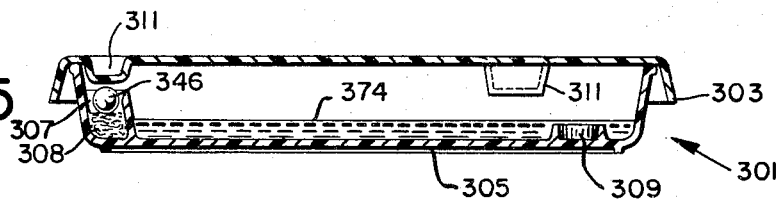
FIG. 15 is a cross-sectional side elevation view of the petri dish of FIG. 14.

Still another petri dish embodiment incorporating different ball release and ball capture means from those described above is shown in FIGS. 14, 15, 16 and 17. Petri dish 301 incorporates a cover 303 and a base 205, both having an equilateral, octagonal shape. Base 305 incorporates a ledge or cup-shaped boss 307 adjacent one of its sides, and a ball-trapping magnet 309 is positioned across base 305 near its diametrically opposed side. The cup-shaped boss 307 holds ball 346 ready for the streaking operation. If desired, as shown in FIG. 15, a plug 308 of absorbent material, such as plastic foam or cotton wool, is seated beneath the ball 346 in the cup of boss 307. Plug 308 absorbs excess liquid coating material when the liquid inoculum is applied directly to the ball by the technician. Cover 303 incorporates near its rim inwardly depending bosses 311 near four of its eight sides, overlying both boss 307 and magnet 309 of base 305. Bosses 311 are arranged so that every pair of diametrically opposed sides contains only one boss. With this arrangement, error free ball capture is assured since a capture aiding boss 311 will always be coaxially arranged with capturing magnet 309 whenever a ball is released.

Figure 17:
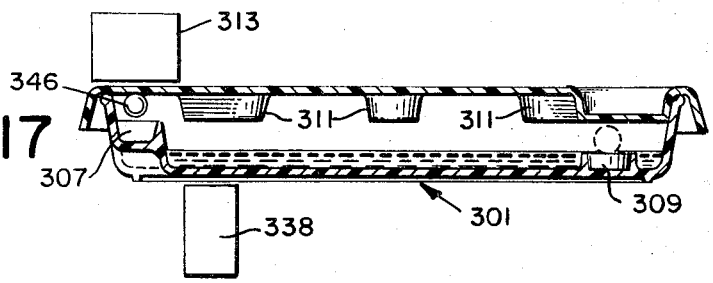
FIG. 17 is a cross-sectional side elevation view of the petri dish of FIG. 16 showing the ball in the process of being dropped into the culture medium and the ball in phantom being trapped.

A further modification of these ball capture devices employs a patch of sticky adhesive material in place of underlying magnet 252 of FIG. 13 or 309 of FIGS. 15 and 17.

In operation, cover 303 is sealed on base 305 with one of bosses 311 aligned with capturing magnet 309. The streaking operation is initiated by positioning ball release magnet 313 over cover 303 directly above ball 346. The attractive force of magnet 313 causes ball 346 to rise until it comes in contact with cover 303. Advancing movement of petri dish 301 moves boss 309 out from under ball 346 and magnet 313. Once ball 346 is in a position directly above the inoculated bacteria laden sample and driving magnet 338, magnet 313 is withdrawn, causing ball 346 to drop into the bacteria sample, clear of boss 307, and ball 346 is immediately captured by the attractive force of magnet 338.

After ball 346 has been drawn through the culture medium 374 along path 50, by magnet 338, magnet 338 draws ball 346 on to capturing magnet 349. Magnet 390 attracts and holds ball 346 in this final position while dish 301 moves beyond magnet 338. An overlying boss 311 is aligned with magnet 309, and aids in preventing ball 346 from being accidentally dislodged from this position by essentially holding ball 346 in contact with magnet 309. This petri dish could be effectively used with only one capture-aiding boss 311 in cover 303, provided the technician properly positions the single boss 311 above ball capture magnet 309.

Figure 16:
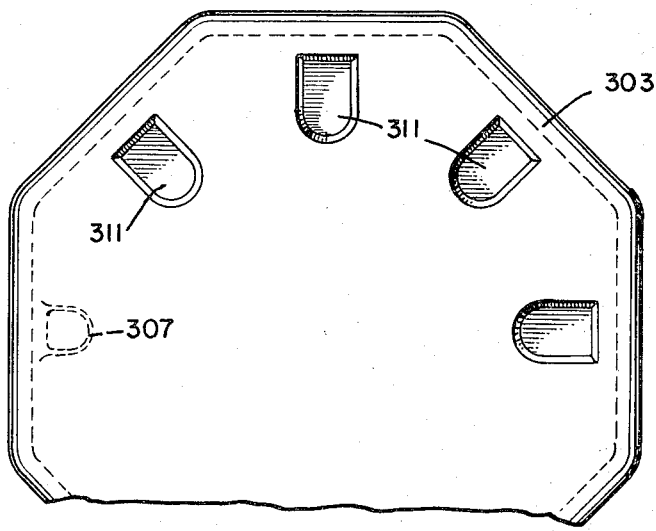
FIG. 16 is a top plan view of a modified version of the petri dish of FIG. 14 with the cover properly positioned for streaking and subsequent ball-capture.

If with petri dish 301 shown, cover 303 was improperly placed on base 305 so that one of the bosses 311 were not juxtaposed with magnet 309, one of these bosses would then be positioned above ball holding boss 307, as shown in FIGS. 16 and 17. When ball releasing magnet 313 is lowered to withdraw ball 346 from boss 307, this boss 311 would then prevent ball 346 from being raised to a position which would allow the ball to be released into culture medium 374. Since ball 346 would never be released when the cover is improperly positioned, the technician, upon realization of the error, would merely have to remove cover 304 and rotate it until one of the bosses 311 was in its proper location. Cover 303 would then be resealed with base 305, and the petri dish returned to the loading stack 25 of the automatic streaking apparatus 20.

The automatic streaking apparatus of this invention provides many advantages over existing streaking procedures. The system described herein allows the streaking process to be accomplished with minimum human exposure to infection. Once the bacteria-laden sample has been deposited in the petri dish, the dish is sealed and the technician is never again exposed to the bacteria sample until after incubation. Another advantage provided is the assurance of complete and uniform positioning of the streaking path throughout the entire petri dish. Total dependence on the technician's manual streaking technique is eliminated and replaced by a reliable, automatic streaking method producing uniform reproducible streak patterns. A consequent advantage of the highly reproducible streaking patterns of the invention is the reliable bacteria-quantitation capability, measured by the dispersion of organisms along the streaking path. A further advantage is the substantial elimination of wasted petri dishes and samples. By providing petri dishes which cannot be contaminated by misorientation of the sealing cover, the covers of this system can be properly oriented and then the dishes automatically streaked without affecting the test results.

The rolling ball 46 forms a highly effective inoculum spreader, which may be used with other culture medium supporting substrates, such as continuous elongated "agar tapes" processed in automatic culture incubation systems. With such tapes, modified delivery mechanisms may be employed for storage and dispensing of individual sterile rolling ball-spreaders onto each separate culture zone of the tape. Rolling drive systems employing reciprocating drive magnets and relative longitudinal oscillating movement produce streaking paths on the agar tape similar to path 50 shown in FIGS. 2 and 9.

Since the foregoing description and drawings are merely illustrative, the scope of the invention has been broadly stated herein and it should be liberally interpreted so as to obtain the benefit of all equivalents to which the invention is fairly entitled.

What is claimed is:

1. Apparatus for spreading micro-organisms over a culture medium comprising:
    A. an underlying substrate supporting said culture medium;
    B. spherically shaped spreading means rollably positioned on said culture medium; and
    C. driving means for moving said spreading means rollably in two directions simultaneously over a predetermined path along said culture medium.

2. Apparatus for spreading micro-organisms over a culture medium comprising:
    A. an underlying substrate supporting said culture medium;
    B. a spherically shaped paramagnetic ball rollably positioned on said culture medium; and
    C. a movable magnet juxtapositioned with said ball for moving said spreading means rollably in two directions simultaneously over a predetermined path along said culture medium.

3. Apparatus as defined in Claim 2, wherein said culture medium comprises an agar gel.

4. Apparatus as defined in Claim 2, wherein said substrate comprises a petri dish having a base containing said culture medium and having a removable cover.

5. Apparatus as defined in Claim 4 wherein the removable cover is formed of transparent material provided with quantitation marks arrayed along and in juxtaposition with said predetermined path.

6. Apparatus as defined in Claim 4, wherein the petri dish includes
    A. initial containing means positioned at the start of said path for releasably holding the rollable spreading means against escape,
    B. and final capturing means positioned at the finish of said path to receive and hold the rollable spreading means against escape,
in combination with releasing means alignable to release the rollable spreading means from the initial containing means for deployment along said path.

7. Apparatus for spreading micro-organisms over a culture medium comprising:
    A. a spherically shaped paramagnetic ball rollably positioned on said culture medium;
    B. a petri dish having a base containing said culture medium and having a removable cover which incorporates suspending means for maintaining said ball above said culture medium; and
    C. a movable magnet juxtapositioned with said ball for moving said ball rollably over a predetermined path along said culture medium.

8. Apparatus as defined in Claim 7, wherein said suspending means comprises a flexible deformable flange releasably supporting the rollable spreading means in a deformable cavity formed in said cover.

9. Apparatus as defined in Claim 7, wherein said suspending means comprises rupturable material which can be broken by the application of a predetermined rupturing force.

10. Apparatus as defined in Claim 4, wherein said base incorporates a concave boss for containing said spreading means.

11. Apparatus as defined in Claim 4, wherein said petri dish includes capturing means for securely holding said spreading means at one end of said predetermined path.

12. Apparatus for spreading micro-organisms over a culture medium comprising:
   A. a petri dish having a base containing said culture medium and having a removable cover;
   B. a spherically shaped paramagnetic ball rollably positioned on said culture medium, and
   C. a movable magnet juxtapositioned with said ball for moving said ball rollably over a predetermined path along said culture medium;
   D. said petri dish including capturing means for securely holding said ball at one end of said predetermined path, wherein said petri dish base incorporates a magnet positioned at one end of said path for capturing and securely holding said ball.

13. Apparatus as defined in Claim 4, wherein said petri dish cover incorporates a magnet positioned at one end of said path for capturing and securely holding said spreading means.

14. Apparatus for spreading micro-organisms over a culture medium comprising:
   A. a petri dish having a base containing said culture medium and having a removable cover;
   B. a spherically shaped paramagnetic ball rollably positioned on said culture medium; and
   C. a movable magnet juxtapositioned with said ball for moving said ball rollably over a predetermined path along said culture medium;
   D. said petri dish base incorporating a V-shaped upstanding flange positioned to receive and to capture said ball after passage across said petri dish, and said cover incorporating an annular boss alignable in juxtaposition with said V-shaped flange and said captured ball for retaining said ball in its captured position.

15. Apparatus as defined in Claim 4, further comprising:
   D. loading means for holding a plurality of said petri dishes prior to micro-organisms spreading;
   E. petri dish releasing means for successive delivery of petri dishes for spreading;
   F. stacking means for receiving and holding the petri dishes after spreading; and
   G. propelling means for moving said petri dishes from said releasing means to said stacking means.

16. Apparatus as defined in Claim 15, wherein said propelling means comprises a drive belt incorporating a plurality of upstanding tabs which come into firm driving engagement with one end of each of said petri dishes and move said petri dishes successively from said loading means past said driving means to said stacking means.

17. Apparatus as defined in Claim 16, wherein said stacking means includes a cam lever for raising the stack of streaked petri dishes by a sufficient amount to allow one end of the following petri dish to move under the base of said stack while said driving means moves the petri dish into position underlying the other petri dishes forming the stack.

18. Apparatus as defined in Claim 15, wherein said driving means is disposed between said loading means and said stacking means and continuously reciprocates in a direction substantially perpendicular to the movement of said petri dish, driving the spreading means on the culture medium along a substantially sinusoidal path of spreading movement relative to the petri dish, said direction substantially perpendicular to the movement of the petri dish being one of said two directions.

19. Apparatus for spreading micro-organisms over a culture medium comprising:
   A. an underlying substrate supporting said culture medium;
   B. a spherically shaped paramagnetic ball rollably positioned on said culture medium; and
   C. driving means for moving said ball rollably over a predetermined path along said culture medium, said driving means including
      (1) a magnet laterally reciprocated beneath said substrate as the substrate is longitudinally advanced;
      (2) a transverse wavy camming surface; and
      (3) a follower arm movably engaging the wavy camming surface during reciprocating movement of the magnet and imparting longitudinal oscillations to the reciprocating magnet.

20. Apparatus as defined in Claim 19, wherein the movement of said follower arm over said camming surface causes said magnet to move relative to said culture medium through a substantially sinusoidal path having wavy longitudinal oscillations superimposed thereon.

21. Apparatus as defined in Claim 4, wherein the rim of said petri dish has the shape of an octagon.

22. Apparatus as defined in Claim 4, wherein said petri dish incorporates two substantially parallel planar sides and two arcurately-curved ends.

23. A method for spreading micro-organisms throughout a culture medium supported by an underlying substrate comprising the steps of
   A. inoculating said culture medium with a bacteria-laden sample at one end of a culture zone thereon;
   B. positioning rollable spherically shaped spreading means on said simple; and
   C. rollably moving said spreading means across said sample and then in two directions simultaneously across non-inoculated portions of said culture zone without further contacting the sample.

24. A method for spreading micro-organisms throughout a plurality of culture mediums, each medium being supported by an underlying substrate, each substrate-supported culture medium being moved in succession in a longitudinal direction through a spreading region; there being a drive magnet in juxtaposition with said spreading region, said method comprising the steps of:
   A. inoculating each culture medium with a bacteria-laden sample at one end of a culture zone thereon;
   B. positioning a rollable spherically shaped spreading means formed of paramagnetic material on said sample; and
   C. rollably moving said spreading means across said sample and then across non-inoculated portions of said culture zone without further contacting the sample, said step of rollably moving including reciprocating said magnet in a direction lateral to said longitudinal direction across said substrate and reciprocating said magnet in said longitudinal direction so that said spreading means traverses a substantially sinusoidal path having wavy longitudinal oscillations superimposed thereon.

References Cited
UNITED STATES PATENTS

| | | | |
|---|---|---|---|
| 3,623,958 | 11/1971 | Fitzgerald | 195—127 |
| 3,677,904 | 7/1972 | Fitzgerald | 195—127 |
| 3,660,243 | 5/1972 | Young | 195—127 |
| 2,971,892 | 2/1961 | Carski | 195—139 |
| 2,787,581 | 4/1957 | Scherr | 195—103.5 R |
| 3,501,379 | 3/1970 | Tate | 195—139 |

ALVIN E. TANENHOLTZ, Primary Examiner

U.S. Cl. X.R.

195—127, 103.5 R, 139